UNITED STATES PATENT OFFICE.

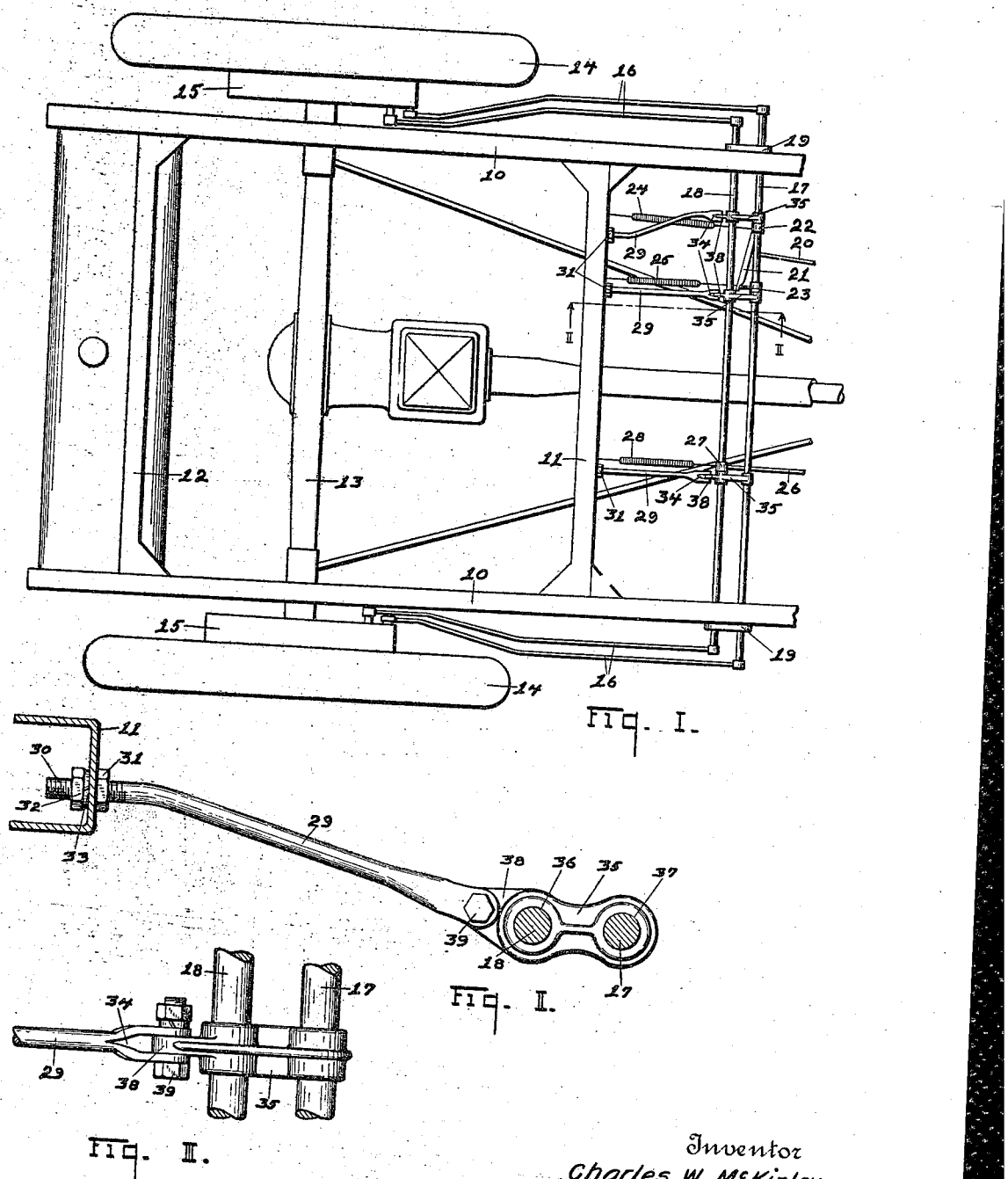

CHARLES W. McKINLEY, OF TOLEDO, OHIO, ASSIGNOR TO THE WILLYS-OVERLAND COMPANY, OF TOLEDO, OHIO, A CORPORATION OF OHIO.

BRAKE-OPERATING MECHANISM.

1,310,801.     Specification of Letters Patent.     Patented July 22, 1919.

Application filed October 29, 1917. Serial No. 199,091.

*To all whom it may concern:*

Be it known that I, CHARLES W. McKINLEY, a citizen of the United States, residing at Toledo, in the county of Lucas and State of Ohio, have invented certain new and useful Improvements in Brake - Operating Mechanism, of which I declare the following to be a full, clear, and exact description.

This invention relates to improvements in brake operating mechanism for motor vehicles.

The principal object of this invention is to provide an improved mounting for the brake shafts for operating the hub brakes of a motor vehicle, which is so designed as to maintain a uniform spacing of the brake shafts, where two parallel brake shafts are used for operating external and internal brakes, and to preserve a uniform spacing between said brake shafts and the cross member of the frame.

A further object of my invention is to provide a brake shaft so mounted as to be braced at substantially the point where force is applied to the shaft, to rotate the same in operating the brakes. A further object of my invention is to provide a construction in which a pair of parallel brake shafts are provided for operating internal and external brakes, said brake shafts being separately operated and being uniformly spaced apart at a plurality of points between the side members of the frame, and braced from a cross member of the frame, so as to maintain said brake shafts in alinement, said bracing being located at substantially the points where force is applied to the shafts in order to rotate them in setting the brakes.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a top plan view of the chassis of an automobile embodying my invention.

Fig. II is a detail, sectional view, taken substantially on the line II—II of Fig. I.

Fig. III is a fragmentary view showing one of the spacing blocks and its connection with the bracing arm, in top plan view.

In the drawings, similar reference numerals refer to similar parts throughout the several views and the sectional view is taken looking in the direction of the little arrows at the ends of the section lines.

Considering the numbered parts of the drawing, I have illustrated the chassis of a motor vehicle, having a frame comprising the side members 10, and the cross members 11 and 12. The rear axle 13 carries the wheels 14, having the hub brakes 15, which are provided with internal and external brakes, not shown. These brakes are operated by the rods 16, one of said rods 16 being connected to operate the internal brakes, while the other is connected to operate the external brakes. A pair of brake shafts, 17 and 18, extend transversely of the frame and parallel to each other and are journaled at their ends in bosses 19, mounted on the channels 10 forming the side members of the frame. The shafts 17 and 18 are connected by means of arms to the rods 16, in the usual manner, so that the rotation of the shafts 17 and 18 will operate the internal and external brakes at the wheel hubs. The brake shaft 17 is operated by means of the rod 20, which is connected between the ends of the bar 21, the ends of which are connected to arms 22 and 23 mounted in the shaft 17, so that a forward pull on the rod 20 serves to rotate the shaft 17 to set the brakes. Said brake shaft 18 is rotated by means of the rod 26, the rear end of which is connected to an arm 27 on the brake shaft 18, so that a forward pull on the rod 26 serves to rotate the shaft 18 and set the brakes connected therewith. The brake shafts 17 and 18 are returned to normal position by means of the springs 24, 25 and 28, connected to the arms 22, 23 and 27, respectively.

My invention has to do particularly with means for preserving a uniform spacing between the brake shafts 17 and 18, and between said shafts and the cross member 11 of the frame, so that, when force is applied to either of the shafts to set the brakes, it will not tend to spring these shafts out of alinement with each other. To accomplish this purpose, I have provided the spacing blocks 35, which maintain a uniform distance between the shafts 17 and 18 and are preferably located at substantially the points where force is applied to the shafts in order to rotate them. These spacing blocks are also preferably connected by an arm with the cross member 11, so as to maintain a uniform distance between the brake shafts and the cross member.

I have provided a plurality of brace rods 29, the rear ends of which extend transversely through the side of the channel 11, forming a cross member of the frame. The rear ends of the brace rod 29 are threaded at 30, and nuts 31 and 32 are threaded on said ends 30 on opposite sides of the member 11, so as to positively and adjustably connect the end of the brace rod 29 to the cross member 11. A spring washer 33 is preferably provided between the channel 11 and the nut 32. The forward end of the brace rod 29 is forked at 34 for connection with the spacing block. I have provided a plurality of spacing blocks 35, each of which is provided with a pair of transversely extending openings 36 and 37, the brake shaft 18 being disposed in the opening 36 while the brake shaft 17 extends through the opening 37. Said spacing blocks 35 are provided with rearwardly extending ears 38, which are disposed in the forks 34 of the brace rods 28, and pivotally connected therewith by means of the bolts 39.

The spacing blocks 35 are located closely adjacent the arms 22, 23 and 27 so that these spacing blocks are located at substantially the points where force is applied to the shafts 17 and 18 in order to rock the same, and hence they act as a brace to maintain the shafts 17 and 18, parallel to each other and to the cross member 11 of the frame, in opposition to the thrust exerted in actuating the brake shafts, which might tend to spring them out of alinement with each other due to the fact that these brake shafts 17 and 18 are usually made of light stock.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. In a motor vehicle, the combination with a frame, provided with side members and cross members; of a pair of suitably journaled brake shafts extending transversely of the frame and parallel to each other; a plurality of spacing blocks engaging said shafts intermediate said side members to preserve a uniform spacing between said shafts; and arms connecting said blocks to one of the cross-members of said frame to preserve a uniform spacing between said shafts and said cross-members.

2. In a motor vehicle, the combination with a frame, having side members and cross-members; of a pair of suitably journaled brake shafts extending transversely of said frame and parallel to each other; a plurality of spacing blocks engaging said shafts intermediate the side members of said frame to maintain a uniform spacing between said shafts; and an arm connected to one of the cross-members of the frame and pivotally connected at the other end to one of said spacing blocks, to maintain uniform spacing between said shafts and said cross-member.

3. In a motor vehicle, the combination with a frame, having side members and cross-members; of a pair of suitably journaled brake shafts extending transversely of said frame and parallel to each other; a spacing block provided with a pair of transversely extending openings through which said shafts extend; and an arm connected at one end to a cross-member of the frame, and pivotally connected at the other end to an ear extending from said spacing block.

4. In a motor vehicle, the combination with a frame, having side members and cross-members; of a pair of brake shafts extending transversely of the frame and parallel to each other; a spacing block carried by said brake shafts and provided with a pair of transversely extending openings through which said shafts extend, said spacing block being provided with a projecting ear; and an arm adjustably connected at one end to a cross-member of the frame and pivotally connected at the other end to said ear.

5. In a motor vehicle, the combination with a frame, of a plurality of suitably journaled brake shafts extending transversely of the frame, a spacing member between said shafts intermediate the side members of the frame, and an arm connecting said spacing member with said frame.

6. In a motor vehicle, the combination with a frame, of a plurality of suitably journaled brake shafts extending transversely of the frame, means for rotating said shafts for the purpose of applying the brakes, a spacing member between said shafts intermediate the side members of the frame, an arm connecting said spacing member with said frame, and springs for returning said shafts to normal position.

In testimony whereof I affix my signature.

CHARLES W. McKINLEY.